United States Patent [19]
Martin

[11] 4,094,233
[45] June 13, 1978

[54] AUTOMATIC COFFEE MAKER WITH INLET WATER CONTROL MEANS IN RESPONSE TO COLD WATER AND HOT WATER LEVELS

[75] Inventor: John C. Martin, Springfield, Ill.

[73] Assignee: Bunn-O-Matic Corporation, Springfield, Ill.

[21] Appl. No.: 731,716

[22] Filed: Oct. 12, 1976

[51] Int. Cl.² .............................................. A47J 31/00
[52] U.S. Cl. .............................................. 99/305
[58] Field of Search .......................... 99/305, 280–281, 99/282–283, 290, 292–293, 294, 299–300, 302–303, 304, 306

[56] References Cited
U.S. PATENT DOCUMENTS

| | | | |
|---|---|---|---|
| 3,036,512 | 5/1962 | Tarrant et al. | 99/305 |
| 3,100,434 | 8/1963 | Bunn | 99/305 X |
| 3,261,279 | 7/1966 | Kaplan et al. | 99/282 |
| 3,348,468 | 10/1967 | Eisendrath | 99/282 |
| 3,354,810 | 11/1967 | Lorang | 99/282 |
| 3,691,933 | 9/1972 | Martin | 99/282 |
| 3,771,432 | 11/1973 | Karlen | 99/304 |

Primary Examiner—Harvey C. Hornsby
Assistant Examiner—Arthur O. Henderson
Attorney, Agent, or Firm—Lockwood, Dewey, Zickert & Alex

[57] ABSTRACT

Cold water is supplied through an inlet water line from a source under pressure to a cold water basin from which it is siphoned to a hot water tank therebelow. The hot water is siphoned out of the tank for brewing coffee extract. A valve in the inlet water line is closed when the level of the cold water in the basin engages a probe or collar the elevation of which can be adjusted. Under conditions of low water pressure the siphon to the tank may start before the shutoff level in the basin is reached. Water may continue to flow without that level being reached. The level of the hot water then rises above the siphon out level of the hot water siphon and engages a probe resulting in closure of the valve to prevent further flow through the hot water siphon and overflow of the tank. Should the level of the water in the basin rise above the shutoff level, a float switch is opened to close the valve.

11 Claims, 2 Drawing Figures

AUTOMATIC COFFEE MAKER WITH INLET WATER CONTROL MEANS IN RESPONSE TO COLD WATER AND HOT WATER LEVELS

This invention relates generally, to coffee makers and it has particular relation to automatic coffee makers. It constitutes an improvement over the coffee makers disclosed in U.S. Pat. Nos. 3,593,650 issued July 20, 1971; 3,608,471 issued Sept. 28, 1971; 3,691,932 issued Sept. 19, 1972, and 3,793,934 issued Feb. 26, 1974.

When the automatic coffee maker of the kind disclosed in U.S. Pat. No. 3,793,934 issued Feb. 26, 1974 is employed, there is the possibility, under conditions of low water pressure, for example, 5 pounds per square inch, that the rate of flow of the incoming water may be so low that the shutoff level of the water in the basin may not be reached. The cold water continues to siphon into the hot water tank where it may continue to be siphoned out and the water level in the tank may rise above the siphon out level and overflow the tank. Also the water in the basin may rise above the shutoff level and overflow.

In view of the foregoing among the objects of this invention are: To provide for shutting off the flow of incoming water to the basin should the level of the hot water in the tank rise in it above a predetermined level; to shut off the flow of incoming water to the basin when the water level in it rises to a predetermined shutoff level; to shut off the flow of incoming water should the water level in the basin rise to a predetermined level above the shutoff level; to employ a float switch for this purpose; and to employ probe means for detecting the rise of the water to the shutoff level and the rise of the water in the tank to a predetermined level above the siphon out level.

Figure 1:
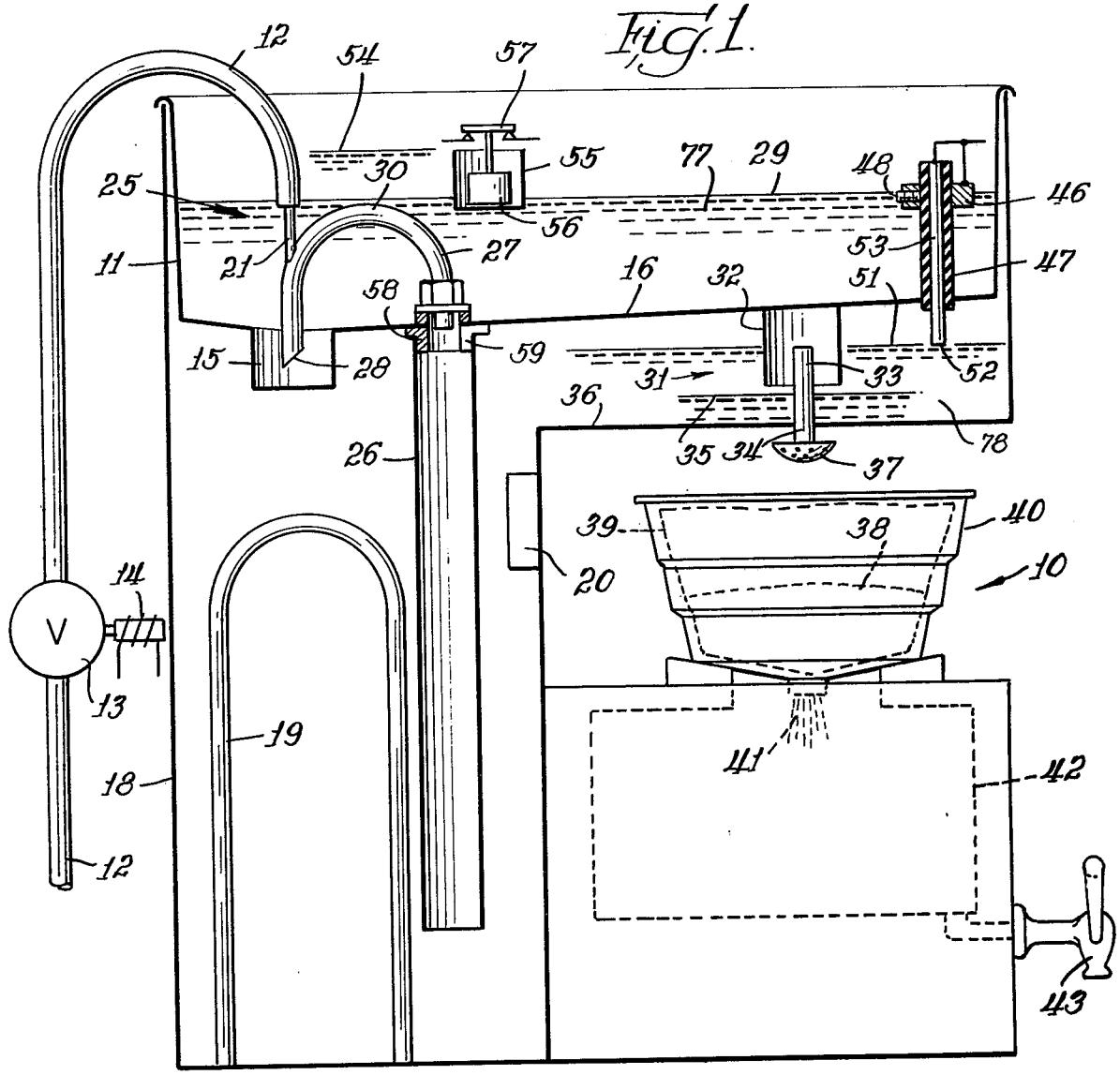
FIG. 1 is a view of a coffee maker, partly in side elevation and partly diagrammatic, which illustrates a preferred embodiment of this invention.

Referring now to FIG. 1, it will be observed that the reference character 10 designates, generally, an automatic coffee maker embodying this invention. The automatic coffee maker 10 includes a cold water basin 11 of metal to which cold water is supplied by an inlet water line 12 when a valve 13 is opened. The valve 13 is a solenoid-operated valve and normally is biased closed. A winding 14, when energized, opens the valve 13 to permit cold water to flow through the inlet water line 12 into the basin 11. The inlet water line 12 opens into a sump 15 that is located in the bottom wall 16 of the cold water basin 11.

Below the cold water basin 11 there is a hot water tank 18 of metal in which is located a heating element 19 that is controlled by a thermostat 20. The joints between cold water basin 11 and the hot water tank 18 are such that the upper ends of each are vented to the atmosphere and thus a special vent is not required for either the cold water basin 11 or the hot water tank 18.

The inlet water line 12 has an inverted U-shaped upper end that terminates in a small diameter pipe 21 to provide a jet action in the intake end of cold water inlet siphon means shown, generally, at 25.

The cold water from the cold water basin 11 is transferred to the hot water tank 18 by the cold water inlet siphon means which includes a cold water inlet pipe 26 that extends to the lower end of the tank 18. The cold water inlet siphon means 25 has an inverted U-shaped upper part 27 which opens at 28 in the sump 15. As long as the pressure of the incoming water is sufficient to maintain the jet action at the discharge end of the small diameter pipe 21, the siphon out action of the cold water inlet siphon means 25 is delayed.

When the level of the cold water in the basin 11 reaches the level indicated by line 29, which is above the bight 30 of the inverted U-shaped upper part 27 and the valve 13 is closed, the cold water is siphoned into the tank 18. It will be understood that the amount of cold water supplied to the level 29 determines the amount of hot water that is used for one brewing cycle.

The hot water in the tank 18 is withdrawn by hot water siphon means indicated, generally, at 31. It comprises an inverted cup 32 which depends from the bottom wall 16. The upper end portion 33 of a discharge tube 34 extends into the inverted cup 32. Hot water is siphoned out of the hot water tank to a siphon-out level, shown by the line 35 that may be about 1/16 inch below the lower end of the cup 32. The discharge tube 34 extends through the bottom wall 36 of the hot water tank 18 and terminates in a sprayhead 37 that is arranged to distribute hot water over ground coffee 38 that is carried by a paper filter 39 which is supported in a funnel 40 that is suitably mounted on the coffee maker 10. Coffee extract 41 flows downwardly from the funnel 40 into an insulated coffee reservoir 42 and may be withdrawn by a faucet 43.

When the cold water in the basin 11 reaches the level indicated at 29, probe means in the form of a collar 46 of conducting material is engaged and a circuit is completed, as described hereinafter, for effecting the deenergization of winding 14 and closure of the inlet valve 13. The collar 46 is adjustably mounted on an insulating sleeve 47 and a set screw 48 is provided for holding the collar 46 in place. By shifting the elevation of the collar 46 the shutoff water level 29 can be adjusted to vary the quantity of hot water that is transferred to the tank 18 for coffee brewing purposes.

It is usual that the pressure of the cold water entering the basin 11 may be of the order of 20 to 60 pounds per square inch. With such a range of pressures, the rate of flow of the incoming cold water is such that the siphon action of the cold water inlet siphon means 25 is delayed and does not start until the shutoff water level 29 is reached and the collar 46 engaged to effect the closure of the valve 13.

It has been found, in certain instances, that the pressure of the cold water in the inlet water line 12 may be relatively low, for example it may only be 5 pounds per square inch. When the pressure of the incoming water is relatively low, the siphon action of the cold water inlet siphon means 25 may start and the shutoff water level 29 may not be reached. The collar 46 then is not engaged by the cold water and the valve 13 is not shut off. The continued flow of water into the tank 18 causes the water level therein to rise above the siphon out level 35, and, if the flow of incoming cold water is not arrested, the tank 18 will overflow while the hot water siphon means 31 continues to withdraw hot water from the tank 18. The rate at which the cold water flows into the tank 18 is somewhat greater than the rate at which the hot water is withdrawn from the tank 18 with the result that the water level in the tank 18 may rise to the level indicated by line 51. Here the hot water engages the lower end 52 of a probe 53 in the form of a metallic rod extending through the insulating sleeve 47. Thereupon a circuit is completed through the hot water in the tank 11 to effect closure of the valve 13.

There is the possibility that the rise of the cold water in the basin 11 to the shutoff level 29 and contact with the collar 46 may not effect the closure of valve 13. The water level in the tank 11 then may rise to that indicated by line 54. In order to take care of such action there is provided in the basin 11 a float chamber 55. When the water in the basin reaches the level indicated at 54, the float chamber 55 is filled with water and a float 56 therein rises to open normally closed contacts 57. In order to vent further to the atmosphere the upper end of the hot water tank 18, a fitting 58 at the upper end of the pipe 26 is provided with a transverse slot 59 thereby placing the space above the hot water in the tank 18 in communication with the inverted U-shaped upper part 27 of the inlet siphon means 25.

Figure 2:
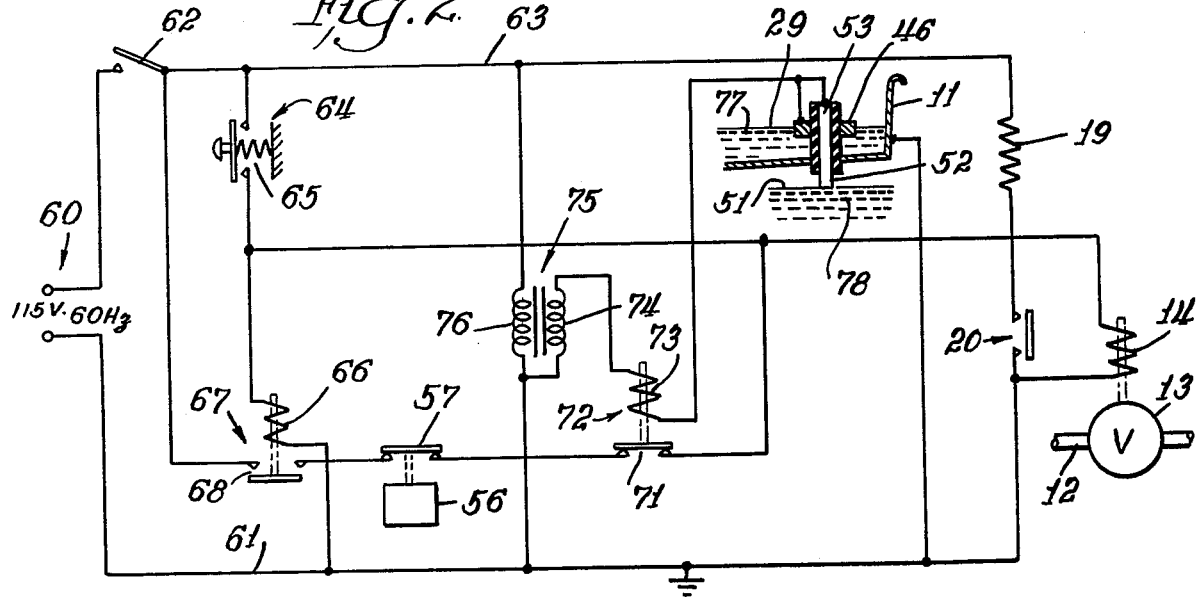
FIG. 2 shows diagrammatically the circuits that are employed for the coffee maker illustrated in FIG. 1.

The circuits employed for operating the automatic coffee maker 10 are illustrated in FIG. 2. Here it will be observed that conductors 60 and 61 are connected to a suitable current source operating at 115 volts, 60 Hz. A switch 62 interconnects conductor 60 and a conductor 63. Conductor 61 is grounded as indicated. In order to start the brewing cycle a start swtich 64 is operated to close normally open contacts 65 to complete an obvious energizing circuit for the winding 14 to open the valve 13. Closure of the contacts 65 also completes an obvious energizing circuit for a winding 66 of a holding relay that is indicated, generally, at 67. Thereupon, normally open contacts 68 are closed to complete a holding circuit and to permit release of the start switch 64.

It will be noted that the contacts 57, operated by the float 56 are connected in series in the holding circuit through the contacts 68. As long as the water in the basin 11 does not reach the level 54, the contacts 57 remain closed and the holding circuit remains completed.

The holding circuit also extends through normally closed contacts 71 of a water level control relay that is indicated, generally, at 72. Its winding 73 is arranged to be energized from a secondary winding 74 of an isolating transformer that is indicated at 75. Primary winding 76 of the transformer 74 is connected for energization between conductors 61 and 63.

When cold water 77 reaches the shutoff level 29 and engages the collar 46, a circuit is completed for energizing the winding 73 through the cold water and wall of the basin 11 to ground.

As a result of the energization of winding 73, contacts 71 are opened, the holding circuit is interrupted and winding 66 of the holding relay 67 is de-energized. Also, interruption of the holding circuit by opening of contacts 71 de-energizes winding 14 and the valve 13 closes.

It will be understood that the heating element 19 is connected between the conductors 61 and 63 through the contacts of the thermostat 20 and that its operation is independent of the various control functions of the circuitry described.

It will be recalled that the level of the hot water 78 in the tank 18 may rise to that indicated at 51 where the lower end 52 of the probe 53 in the form of a metallic rod is engaged. The energizing circuit for the winding 73 of the control relay 72 then is completed through hot water 78 in the tank 18 to ground. Contacts 71 are opened to open the holding circuit for the winding 14 of the valve 13 and the winding 66 of the holding relay 67.

After opening of the holding circuit by opening of either contacts 57 or 71, the hot water siphon means 31 continues to operate until the hot water is withdrawn from the tank 18 to the level indicated at 35, the siphon-out level. This may cause some variation in strength of the coffee extract 41. However, this is preferable to permitting the basin 11 or the tank 18 to overflow. Attention then can be given to the cause of the rise of the cold water in the basin 11 to the level indicated at 54. Also attention can be given to the low water pressure condition which should be corrected to effect normal operation of the coffee maker 10.

While the energization of the winding 73 of the water level control relay 72 is controlled by the conductivity of the cold water 77 or the hot water 78, as the case may be, it will be understood that other means including solid state control means responsive to this conductivity can be employed for energizing the winding 73 when either the cold water shutoff level 29 or the hot water shutoff level 51 is reached in the cold water basin 11 and in the hot water tank respectively.

I claim:

1. In brewing apparatus comprising, a cold water basin, an inlet water line for supplying cold water to said basin from a source under pressure, a valve in said inlet water line, means for opening said valve to cause cold water to flow into said basin, means for closing said valve when said cold water basin is filled to a predetermined shutoff level, a hot water tank under said basin, means for heating water in said tank, a cold water inlet from said tank to brew coffee extract, and means for closing said valve in the event that the water in said tank rises to a predetermined level therein, the improvement wherein said cold water inlet includes siphon means arranged to start when said shutoff level is reached by water supplied at or above a predetermined pressure and likely to start when water is supplied at a pressure below said predetermined pressure and said shutoff level is not reached whereby water continues to flow into said tank, said means for withdrawing hot water from said tank includes siphon means, and said means for closing said valve includes probe means adapted to be energized by water in said basin and water in said tank respectively.

2. Coffee brewing apparatus according to claim 1 wherein said probe means includes a vertical insulating sleeve extending from said basin into said tank, a conducting collar on said sleeve the elevation of which determines said shutoff level, and a conducting rod extending through said sleeve the elevation of the lower end of which determines said predetermined level in said tank.

3. Coffee brewing apparatus according to claim 1 wherein means close said valve when the level of the water in said basin reaches a level above said shutoff level to prevent overflow of said basin.

4. Coffee brewing apparatus according to claim 3 wherein said means for closing said valve when the level of the water in said basin reaches a level above said shutoff level includes normally closed contacts arranged to be opened by a float in said basin.

5. Coffee brewing apparatus comprising: a cold water basin, an inlet water line for supplying cold water to said basin from a source under pressure, a valve in said inlet water line, means for opening said valve to cause cold water to flow into said basin, means for closing said valve when said cold water basin is filled to a predetermined shutoff level, a hot water tank under said basin, means for heating water in said tank, cold water inlet siphon means connecting said basin and said tank, hot water siphon means for withdrawing hot water from said tank to brew coffee extract, said cold water inlet siphon means being characterized by not starting until the level of the water in said basin reaches a predetermined level as long as said pressure is above a predetermined value and being likely to start when said pressure is below said value whereby the cold water in said basin does not reach said shutoff level whereupon the level of the hot water in said tank rises above the siphon-out level of said hot water siphon means, and means for closing said valve in the event that the water in the tank rises to a predetermined level above said siphon-out level of said hot water siphon means.

6. Coffee brewing apparatus according to claim 5 wherein cold water is supplied from said basin to said tank by said cold water inlet siphon means at a rate greater than the rate at which hot water is withdrawn by said hot water siphon means.

7. Coffee brewing apparatus according to claim 5 wherein means close said valve when the level of the water in said basin reaches a level above said shutoff level to prevent overflow of said basin.

8. Coffee brewing apparatus according to claim 7 wherein said means for closing said valve when the level of the water in said basin reaches a level above said shutoff level includes normally closed contacts arranged to be opened by a float in said basin.

9. Coffee brewing apparatus according to claim 5 wherein said means for closing said valve includes probe means adapted to be engaged by water in said basin and tank respectively.

10. Coffee brewing apparatus according to claim 9 wherein said probe means includes a vertical insulating sleeve extending from said basin into said tank, a conducting collar on said sleeve the elevation of which determines said shutoff level, and a conducting rod extending through said sleeve the elevation of the lower end of which determines said predetermined level in said tank.

11. Coffee brewing apparatus according to claim 10 wherein said collar is adjustable vertically to change the elevation of said shutoff level.

* * * * *